2,824,019

AN ORIENTED, HEAT-SET POLYETHYLENE TEREPHTHALATE FILM COATED WITH A PLASTICIZED NITROCELLULOSE RESIN CONTAINING A SULFONAMIDE-ALDEHYDE RESIN

David Ivan Sapper, Cheektowaga, N. Y., assignor to E. I. du Pont de Nemours and Company, Wilmington, Del., a corporation of Delaware No Drawing. Application January 17, 1956
Serial No. 559,747

6 Claims. (Cl. 117—7)

This invention relates to the manufacture of polyethylene terephthalate film. More particularly it relates to the preparation of polyethylene terephthalate film suitable for conversion to bags, containers and similar packages.

The desired properties for packaging films are well known. They include strength, heat-sealability, durability of the heat-seal as well as durability of the complete film, moisture-proofness, low permeability to oxygen and carbon dioxide, high gloss, slip, transparency, clarity and freedom from electrostatic charges.

Polyethylene terephthalate film, prepared in accordance with the procedure described in U. S. Patent 2,465,314 of Whinfield and Dickson, requires a special treatment to obtain strength. This treatment involves orienting the film by stretching and/or rolling followed by heating the film at constant length to set it in the oriented condition. One such process which involves stretching the film 2.5 to 3.25 times its original dimensions and setting it by heating while holding it under tension at a temperature of 150° to 200° C. is described in a copending application U. S. Serial No. 287,354, filed May 12, 1952 to A. C. Scarlett. Orienting, however, produces changes in the film tending to impair some of the remaining properties of the film. For instance, after orienting polyethylene terephthalate film it is no longer possible to heat-seal the film with most conventional heat-sealing apparatus and obtain durable bonds. Attempting to heat-seal results in severe shrinkage with accompanying puckering and weakness at the seal. This is attributable to the high temperatures, 235° to 240° C., required for heat-sealing the polyethylene terephthalate film.

The industry has recognized this major obstacle to the use of polyethylene terephthalate film as a packaging material. Several remedies have been proposed but these remedies tend to improve heat-sealability at the expense of some other property. A polyethylene terephthalate film possessing all the optimum requirements for use in a wide variety of commercial packaging applications has remained an elusive goal.

The object of the present invention is to provide a polyethylene terephthalate film fulfilling the requirements of packaging material, i. e. strength, durability, heat-sealability, moisture-proofness, low permeability to gases, etc. Another object is a process for manufacturing oriented heat-set polyethylene terephthalate film that is heat-sealable at relatively low temperatures. Other objects will appear hereinafter.

The objects are accomplished by coating oriented, heat-set polyethylene terephthalate film with a lacquer containing nitrocellulose, a plasticizer for nitrocellulose, and a resin of sulfonamide-aldehyde. The composition of the lacquer based on the weight of the solids therein is preferably at least 25% nitrocellulose, at least 25% of a plasticizer for the nitrocellulose, and greater than 10% of the sulfonamide-aldehyde resin.

As the nitrocellulose component, it is preferred to use a nitrocellulose that can be well plasticized by plasticizers at slightly elevated temperatures and that can tolerate relatively large amounts of plasticizer without becoming tacky especially as dried. The nitrocellulose component, it has been discovered, can be any of the "soluble" grades of nitrocellulose containing between 10.5% and 12.2% nitrogen and having viscosities of at least ¼ second, preferably 3 to 6 seconds, at 25° C. as determined by formula C of ASTM Method D-301-33.

For the plasticizer, phthalates such as dibutyl phthalate and dicyclohexyl phthalate are particularly advantageous. The plasticizer should be a solvent softener which will plasticize the nitrocellulose significantly without contributing any odor, taste, or color to the final film. Others which may be used include benzyl butyl phthalate, cyclohexyl butyl phthalate, butyl phthalylbutyl glycolate, dibutyl sebacate, butyl benzoyl benzoate, dicyclohexyl adipate, triphenyl phosphate, tricresyl phosphate, etc. or mixtures of these and/or similar materials.

As the resin, it is preferred to use aryl sulfonamide-formaldehyde resins known commercially as "Santolite" MHP [1] and "Sontolite" MS [1].

In a specific embodiment of this invention a base film of polyethylene terephthalate, stretched three times its original dimensions in two directions and heat-set at 200° C. while under tension, was coated with a lacquer by passing the base film through a dip tank at a rate of about 30 meters per minute. The film prior to coating was 45 inches wide and 0.0005 inch thick. The lacquer was prepared by using a solvent mixture containing 57.3% methyl ethyl ketone, 38.2% toluene and 4.5% ethanol. The following components were added by stirring and heating to 50° to 60° C. during a period of about 1 to 2 hours.

|  | Percent |
|---|---|
| Nitrocellulose (11.45%–11.65% nitrogen) | 49.14 |
| Aryl sulfonamide-formaldehyde resin | 13.58 |
| Dicyclohexyl phthalate | 19.03 |
| Dibutyl phthalate | 9.97 |
| Sulfuric acid-treated wood rosin [1] | 5.02 |
| Paraffin wax | 3.02 |
| Bentonite clay [2] | 0.24 |

[1] "Polypale" WG, manufactured by Hercules Powder Co.
[2] "BC Volclay," manufactured by C. A. Wagner Co.

It should be noted that the time and temperature used in preparing the coating lacquer must be controlled to prevent any substantial condensation reaction between the plasticizers and the resin.

The coating lacquer in the dip tank was at a temperature of 35° to 41° C. After being applied to the film from the dip tank, the coating was smoothed on the film by passing the coated film through doctor rolls set with a 4.6 mil opening. The film was then dried at a temperature between 105° and 120° C.

The coated film had excellent slip; was clear and transparent; was substantially moisture-proof; and possessed the physical properties given below:

| | | |
|---|---|---|
| Coating weight | grams/m.[2] | 5.4 |
| Thickness | inches | .00068 |
| Heat-seal strength | grams | 360 |
| Water vapor permeability | do | 80 |
| Tenacity | lbs./in.[2] | 16,100 |
| Elongation | percent | 61.8 |
| Modulus | lbs./in.[2] | 537,900 |
| Tear strength | grams | 9.1 |
| Impact strength | kilograms-centimeter | 30.8 |

[1] Manufactured by Monsanto Chemical Company.

The physical properties presented above were determined as follows:

Coating weight was determined by immersing a portion of the film in cyclohexanone at room temperature for 15 minutes or longer if necessary to dissolve the coating entirely; rinsing in ethyl acetate; and drying overnight at room temperature and 35% relative humidity. The sample was weighed before and after this treatment to determine the coating weight.

Moisture vapor permeability was determined by placing the test film over the top of an aluminum cup containing 15 milliliters of water, the test area being 33.3 square centimeters. The assembly was weighed accurately and then placed in a dry (less than 3% relative humidity) air-swept oven at 39.5° C. for 24 hours. The assembly was removed from the oven, cooled to room temperature and reweighed. The weight loss was converted to grams of water lost/100 square meters/hour.

Heat-seal strength was measured by cutting a piece of the coated film 4" x 10" with the grain running in the long direction into two pieces 4" x 5". The two pieces were superimposed so that opposite surfaces were in contact. The two pieces of superimposed film were then sealed together at each end at right angles to the grain. A ¾" wide sealing bar heated to a temperature of 160° C. at 20 pounds per square inch pressure contacted the ends for two seconds. The sealed sheets were then cut in half at right angles to the grain. From the center of the four resulting pieces, 1½" wide strips parallel to the grain were cut. The four sets of strips were then conditioned for 2 to 3 days at 75° F. and 35% relative humidity. They were tested by opening each set of strips at the free ends, placing them in a Suter testing machine and pulling them apart. The heat-seal strength was the highest force in grams required to pull the strips apart.

The remaining measurements and tests were conventional.

The invention will be more fully understood by referring to the examples that follow. In the examples, parts are by weight unless otherwise specified.

EXAMPLE I

This example illustrates the critical importance of selecting the quantity of resin for use in the coating formulation.

Coating lacquers were prepared by using 53 parts of nitrocellulose (11.45%–11.65% nitrogen), 40 parts of a plasticizer composed of equal parts of dibutyl phthalate and dicyclohexyl phthalate, and from 5 to 60 parts of an aryl sulfonamide-formaldehyde [2] resin. These components were added to a solvent mixture of 60% methyl ethyl ketone and 40% toluene at a temperature of 50° to 60° C. and stirred for a period of 1 to 2 hours. Resulting coating compositions contained from about 8% to about 20% solids.

Polyethylene terephthalate film, oriented and heat-set in accordance with the procedure described previously, was passed through a dip tank containing the coating lacquer at a temperature of about 30° C. Doctor knives set with a 3–4 mil opening smoothed the lacquer on the polyethylene terephthalate film. The coated film was subsequently dried at 100° to 120° C.

The properties of the resulting films, except heat-seal strength, were substantially independent of the percentage of the aryl sulfonamide-formaldehyde resin used. The heat-seal strengths varied and the importance of using more than 10% of the resin is brought out in Table 1. It was also discovered that no significant improvement in heat-seal strength was achieved by using more than about 25% of the resin.

[2] "Santolite" MHP, manufactured by Monsanto Chemical Co.

Table 1

| Test | Resin Concentration | | Coating Weight (g./m.²) | Heat-Seal Strength (grams) |
|---|---|---|---|---|
| | Parts | Percent | | |
| A | 5 | 5 | 12 | 0 |
| B | 10 | 10 | 13 | 0 |
| C | 15 | 14 | 16 | 235 |
| D | 30 | 25 | 16.2 | 155 |
| E | 60 | 40 | 20.1 | 140 |

EXAMPLE II

This example illustrates the critical specification of "at least 25% of plasticizer for nitrocellulose" in the coating formulation.

Coating lacquers were prepared in the manner described in Example I using 53 parts of nitrocellulose (11.45%–11.65% nitrogen), 15 parts of aryl sulfonamide-formaldehyde resin, 5.5 parts of a sulfuric acid-treated wood rosin, 3.33 parts of a paraffin wax, 0.26 part of a bentonite clay, and from 24 to 66 parts of a plasticizer composed of dibutyl phthalate and dicyclohexyl phthalate. The lacquers were coated on oriented, heat-set polyethylene terephthalate film by following the procedure described in Example I.

A comparison of the heat-seal strengths are given in Table 2. It is concluded from these results that at least 25% of the plasticizer is necessary and that best results are obtained with 27% to 31% of a plasticizer. Poor slip properties in the final film were observed when the plasticizer composition was increased above 40%. The other physical properties did not vary significantly from test to test.

Table 2

| Test | Plasticizer | | | Coating Thickness (g./m.²) | Heat-Seal Strength (grams) |
|---|---|---|---|---|---|
| | Ratio of Dibutyl Phthalate: Dicyclohexyl Phthalate | Concentration | | | |
| | | (Parts) | (Percent) | | |
| A | 1:1 | 24 | 24 | 9.5 | 30 |
| B | 1:1 | 28 | 27 | 12.8 | 335 |
| C | 1:1 | 32 | 29 | 11.0 | 255 |
| D | 2:1 | 32 | 29 | 11.6 | 230 |
| E | 1:1 | 35 | 31 | 14.0 | 230 |
| F | 1:1 | 38 | 33 | 11.5 | 170 |
| G | 1:1 | 50 | 39 | 13.6 | 180 |
| H | 1:1 | 60 | 44 | 14.2 | 215 |
| I | 1:2 | 60 | 44 | 15.0 | 175 |
| J | 2:1 | 60 | 44 | 9.8 | 175 |

EXAMPLE III

Coating lacquers were prepared and applied to 4½" wide, 0.0005 inch thick, oriented, heat-set polyethylene terephthalate film in the manner described in Example I. The coating contained 48.6% nitrocellulose (11.45%–11.65% nitrogen), 14.66% dibutyl phthalate, 14.66% dicyclohexyl phthalate, 13.75% of the aryl sulfonamide-formaldehyde resin, 5.04% of a sulfuric acid-treated wood rosin, 3.05% of a paraffin wax and 0.24% of a bentonite clay. The lacquer was applied to provide coating weights of 11, 12, and 17 grams per square meter of base film. The results shown in Table 3 indicate that the ultimate heat-seal strength is satisfactory throughout this range of coating weights.

Table 3

| Test | Coating Weight (g./m.²) | Heat-Seal Strength (grams) |
|---|---|---|
| A | 11 | 262 |
| B | 12 | 402 |
| C | 17 | 288 |

EXAMPLE IV

Example III was re-run with one change—the plasticizer contained 9.77% dibutyl phthalate and 19.55% dicyclohexyl phthalate. Coating weights of 10 and 18 grams per square meter were applied with the following satisfactory results.

Table 4

| Test | Coating Weight (g./m.²) | Heat-Seal Strength (grams) |
| --- | --- | --- |
| A | 10 | 416 |
| B | 18 | 163 |

EXAMPLE V

A base film of polyethylene terephthalate, oriented and heat-set in the manner described previously, was coated with a lacquer by passing the film through a dip tank at a rate of about 30 meters per minute. The lacquer had been prepared by using a solvent mixture containing 57.3% methyl ethyl ketone, 38.2% toluene, and 4.5% ethanol. The following components were dissolved by stirring them into the solvent over a period of about 1 to 2 hours, the solvent being heated to a temperature of 50° C. to 60° C.

|  | Percent |
| --- | --- |
| Nitrocellulose (11.45%–11.65% nitrogen) | 49.14 |
| Aryl sulfonamide-formaldehyde resin | 13.58 |
| Dicyclohexyl phthalate | 19.03 |
| Dibutyl phthalate | 9.97 |
| Sulfuric acid-treated wood rosin | 5.02 |
| Paraffin wax | 3.02 |
| Bentonite clay | 0.24 |

After being applied to the film from the dip tank at a temperature of 35° to 45° C., the coating was smoothed on the film by passing the coated film through doctor rolls set with a 4.6 mil opening. The film was then dried at a temperature between 105° to 120° C.

The coated film displayed the following properties:

| | |
| --- | --- |
| Coating weight grams/m.² | 7.0 |
| Coating thickness inches | .00073 |
| Heat-seal strength grams | 490 |
| Water vapor permeability do | 95 |
| Tenacity lbs./in.² | 15,750 |
| Elongation percent | 68.4 |
| Modulus lbs./in.² | 548,000 |
| Tear strength grams | 7.5 |
| Impact strength kilograms-centimeter | 28.9 |

From the above examples it will be apparent that the coating composition for improving the heat-sealability of oriented polyethylene terephthalate film should contain at least 25% of a plasticizer and over 10% of a sulfonamide-aldehyde resin. Nitrocellulose, the main constituent of the film-forming coating should constitute from 25% to 65% of the composition.

The composition is prepared by dissolving desired amounts of the components in well known organic solvents. The particular solvent mixture must be selected to retain the solvent ingredients in a homogeneous solution until the entire solvent mixture, which must be volatile, is evaporated. Ordinarily the solvent required is sufficient to provide a solution containing from about 8% to about 20% solids. However, the solids may range from 5% to 50%. In forming the coating lacquer, one precaution is worth mentioning again. No substantial reaction between the nitrocellulose plasticizer and the resin should be permitted to take place. Otherwise, the effect of these ingredients in the coating mixture will be substantially diminished.

Other ingredients well known to the art, such as waxes, clays, etc. may be added to the coating formulation for certain specific effects. These are usually added to improve transparency; to provide increased surface slip; and to control moisture-proofness. The addition of these ingredients will of course depend on the end use contemplated for the film.

The coating lacquer may be applied in any suitable manner. In the examples the coating lacquer was applied by passing the film through a tank containing the coating lacquer. However, the coating may be applied by spraying, brushing or, if desired, it may be pressed on the base film in sheet form. The coating may be applied to one side of the film or to both sides. When coating from solutions by passing the film through a dip tank, it is usually easier to coat both sides.

The important result achieved by this invention is to impart heat-sealability to a polyethylene terephthalate film without sacrificing any of the desirable qualities such as transparency, clarity, strength, moisture-proofness, etc. of the base film. Heat-sealability, as it has been used in this specification, encompasses the ability of the film to be heat-sealed at moderate temperature (150° C. to 170° C.) and the resultant strength of the seal. The success of the present invention in not affecting adversely the important properties of the base film is due both to the novel coating formulation and the relatively low heat-sealing temperatures that the coating permits.

The coated films of this invention are useful principally as packaging materials for foods, cigarettes, textiles, hardware, etc. However, polyethylene terephthalate film coated with the novel formulation are useful wherever it is necessary to join such film together.

Since various changes and modifications may be made in the coated film and the process for making it without departing from the spirit and scope of the present invention, the invention is not restricted except as defined in the appended claims.

What is claimed is:

1. A packaging film comprising a base film of oriented, heat-set polyethylene terephthalate having at least one surface coated with a composition comprising at least 25% nitrocellulose having a nitrogen content between 10.5% and 12.2%, at least 25% of plasticizer for the nitrocellulose, and greater than 10% of a sulfonamide-aldehyde resin.

2. A packaging film as in claim 1 wherein the resin is an aryl sulfonamide-formaldehyde resin.

3. A packaging film as in claim 1 wherein at least one of the plasticizer components is selected from the group consisting of dibutyl phthalate, dicyclohexyl phthalate, benzyl butyl phthalate, cyclohexyl butyl phthalate, butyl phthalylbutyl glycolate, dibutyl sebacate, butyl benzoyl benzoate, dicyclohexyl adipate, triphenyl phosphate, and tricresyl phosphate.

4. A packaging film as in claim 1 wherein the plasticizer is a mixture of dibutyl phthalate and dicyclohexyl phthalate.

5. A process for preparing a packaging film which comprises orienting a base film of polyethylene terephthalate; heat-setting the polyethylene terephthalate film by holding it under tension at a temperature of 150° to 200° C.; coating the heat-set, oriented polyethylene terephthalate film with a composition comprising at least 25% nitrocellulose having a nitrogen content between 10.5% and 12.2%, at least 25% of plasticizer for the nitrocellulose, and more than 10% of a sulfonamide-aldehyde resin; and drying the coated film.

6. A process for preparing packaging film which comprises stretching a base film of polyethylene terephthalate 2.5 to 3.25 times its original dimension in at least one direction; heat-setting said polyethylene terephthalate film by holding it under tension at a temperature of 150° to 200° C.; coating said heat-set polyethylene terephthalate film with a composition comprising at least 25% nitrocellulose having a nitrogen content between 10.5% and 12.2%, at least 25% of plasticizer containing at least one compound selected from the group consisting of dibutyl phthalate, dicyclohexyl phthalate, benzyl butyl phthalate, cyclohexyl butyl phthalate, butyl phthalylbutyl glycolate, dibutyl sebacate, butyl benzoyl benzoate, dicyclohexyl adipate, triphenyl phosphate, and tricresyl phosphate and more than 10% of an aryl sulfonamide-formaldehyde resin; and drying the coated film at a temperature of 100° to 120° C.

References Cited in the file of this patent

UNITED STATES PATENTS

| | | |
|---|---|---|
| 2,079,379 | Mitchell | May 4, 1937 |
| 2,525,676 | Hoffman | Oct. 10, 1950 |
| 2,718,666 | Knox | Sept. 27, 1955 |
| 2,751,316 | Phillips | June 19, 1956 |